(12) United States Patent
Fröjd et al.

(10) Patent No.: US 12,384,459 B2
(45) Date of Patent: Aug. 12, 2025

(54) METHODS FOR CONTROLLING A SELF-POWERED DOLLY VEHICLE DURING EVASIVE MANEUVERING

(71) Applicant: Volvo Truck Corporation, Gothenburg (SE)

(72) Inventors: Niklas Fröjd, Mölnlycke (SE); Leo Laine, Härryda Västra Götaland (SE); Mohammad Manjurul Islam, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 561 days.

(21) Appl. No.: 17/797,469

(22) PCT Filed: Feb. 11, 2020

(86) PCT No.: PCT/EP2020/053423
§ 371 (c)(1),
(2) Date: Aug. 4, 2022

(87) PCT Pub. No.: WO2021/160252
PCT Pub. Date: Aug. 19, 2021

(65) Prior Publication Data
US 2023/0080456 A1 Mar. 16, 2023

(51) Int. Cl.
*B62D 13/00* (2006.01)
*B62D 13/02* (2006.01)
(Continued)

(52) U.S. Cl.
CPC ......... *B62D 13/005* (2013.01); *B62D 13/025* (2013.01); *B62D 15/025* (2013.01);
(Continued)

(58) Field of Classification Search
CPC .... B62D 13/005; B62D 13/02; B62D 13/025; B62D 15/025; B62D 53/005; B62D 53/06; B62D 53/0871; B62D 59/04
See application file for complete search history.

(56) References Cited

U.S. PATENT DOCUMENTS

| 8,983,729 B2 | 3/2015 | Hahne |
| 9,598,089 B2 | 3/2017 | Tagesson et al. |

(Continued)

FOREIGN PATENT DOCUMENTS

| AU | 2012216710 A1 | 9/2012 |
| CN | 104204475 A | 12/2014 |

(Continued)

OTHER PUBLICATIONS

Written Opinion for International Patent Application No. PCT/EP2020/053423, mailed May 10, 2022, 6 pages.
(Continued)

*Primary Examiner* — Christopher B Wehrly
(74) *Attorney, Agent, or Firm* — Withrow & Terranova, PLLC

(57) ABSTRACT

A method for controlling steering of a self-powered steerable dolly vehicle during a maneuver, the method comprising determining an articulation angle associated with a drawbar of the dolly vehicle, determining a longitudinal velocity of the dolly vehicle, and controlling the steering of the dolly vehicle based on the articulation angle and on the longitudinal velocity of the dolly vehicle, wherein the controlling comprises initially steering the dolly vehicle in a direction of the articulation angle direction in case the longitudinal velocity of the dolly vehicle is above a velocity threshold.

13 Claims, 8 Drawing Sheets

(51) Int. Cl.
  *B62D 15/02* (2006.01)
  *B62D 53/00* (2006.01)
  *B62D 53/06* (2006.01)
  *B62D 53/08* (2006.01)
  *B62D 59/04* (2006.01)

(52) U.S. Cl.
  CPC .......... *B62D 53/005* (2013.01); *B62D 53/06* (2013.01); *B62D 53/0871* (2013.01); *B62D 59/04* (2013.01)

(56) References Cited

U.S. PATENT DOCUMENTS

| | | | |
|---|---|---|---|
| 10,173,669 | B2 | 1/2019 | Alm et al. |
| 10,518,831 | B2 * | 12/2019 | Wright .................... B60L 50/60 |
| 2001/0054524 | A1 | 12/2001 | Masters et al. |
| 2002/0180178 | A1 * | 12/2002 | Masters ............. B62D 53/0871 280/426 |
| 2017/0106865 | A1 | 4/2017 | Lavoie et al. |
| 2019/0329821 | A1 | 10/2019 | Ziebart et al. |

FOREIGN PATENT DOCUMENTS

| | | |
|---|---|---|
| CN | 107000742 A | 8/2017 |
| CN | 109407517 A | 3/2019 |
| DE | 102015108681 A1 | 12/2016 |
| DE | 102016220281 A1 | 4/2018 |
| DE | 102018100650 A1 | 7/2019 |
| EP | 1900589 A2 | 3/2008 |
| FR | 2930479 A1 | 10/2009 |
| FR | 3028828 A1 | 5/2016 |
| GB | 2371341 A | 7/2002 |
| JP | 2010018251 A | 1/2010 |
| JP | 6521495 B1 | 5/2019 |
| JP | 6525411 B1 | 6/2019 |
| JP | 2019123305 A | 7/2019 |
| SE | 0101289 L | 10/2001 |
| WO | 2013110706 A1 | 8/2013 |
| WO | 2013110708 A1 | 8/2013 |
| WO | 2017073308 A1 | 5/2017 |
| WO | 2019163947 A1 | 8/2019 |
| WO | 2019188437 A1 | 10/2019 |

OTHER PUBLICATIONS

First Office Action for Chinese Patent Application No. 202080095663.X, mailed Feb. 7, 2024, 12 pages.
Intention to Grant for European Patent Application No. 20706134.2, mailed Jan. 24, 2024, 39 pages.
Notification to Grant for Chinese Patent Application No. 202080095663.X, mailed Jul. 11, 2024, 3 pages.
International Search Report and Written Opinion for International Patent Application No. PCT/EP2020/053423, mailed Oct. 8, 2020, 14 pages.
International Preliminary Report on Patentability for International Patent Application No. PCT/EP2020/053423, mailed Jun. 20, 2022, 31 pages.

* cited by examiner

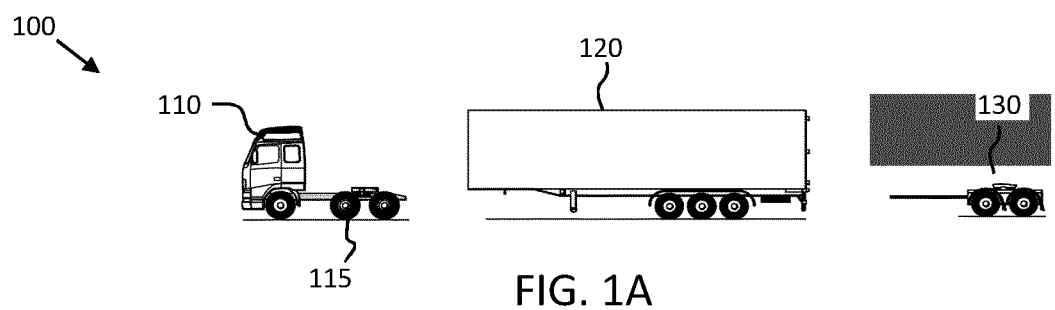
FIG. 1A
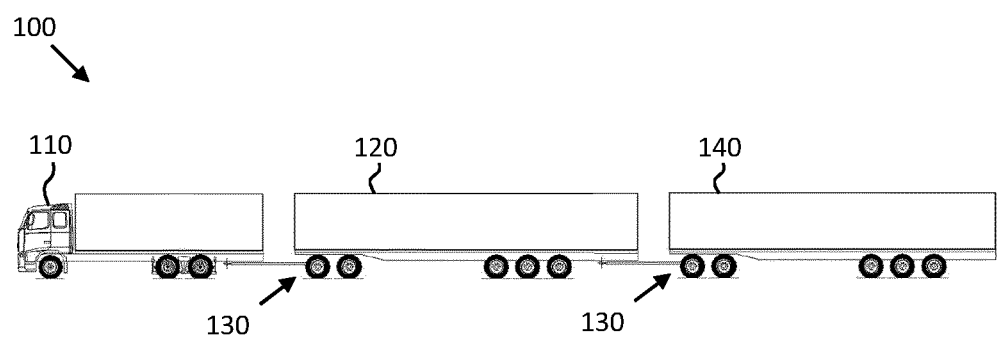
FIG. 1B
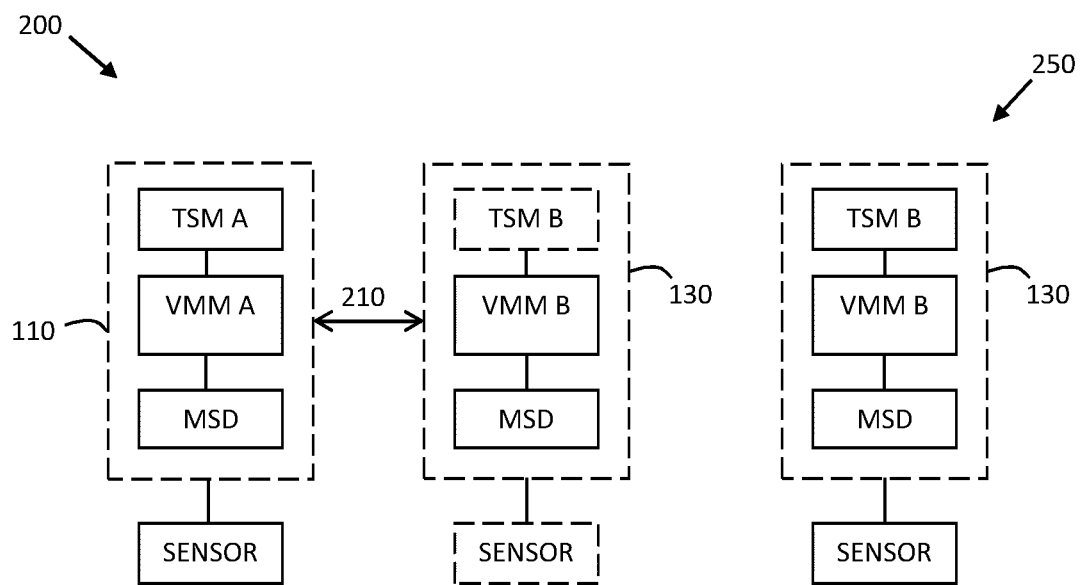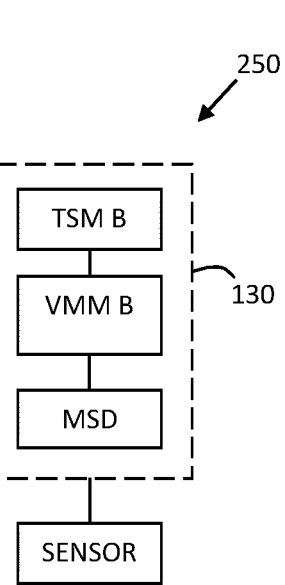
FIG. 2A  FIG. 2B

METHODS FOR CONTROLLING A SELF-POWERED DOLLY VEHICLE DURING EVASIVE MANEUVERING

This application is a 35 USC 371 national phase filing of International Application No. PCT/EP2020/053423, filed Feb. 11, 2020, the disclosure of which is incorporated herein by reference in its entirety.

TECHNICAL FIELD

The present disclosure relates to heavy-duty vehicles, such as trucks and construction equipment, and in particular to dolly vehicles comprising a control unit for controlling dolly vehicle steering. Although the invention will be described mainly with respect to semi-trailer vehicles and trucks, the invention is not restricted to this particular type of vehicle but may also be used in other types of vehicles.

BACKGROUND

A semitrailer vehicle normally comprises a tractor arranged to tow a trailer unit via a fifth wheel connection. In order to extend the cargo transport ability of the semitrailer vehicle, a dolly vehicle can be added to the vehicle combination, which allows for additional trailer units to be towed by the same tractor. A traditional dolly is an unpowered vehicle unit designed for connection to a tractor unit, truck or prime mover vehicle with strong traction power.

Dolly vehicles comprising on-board power sources such as electric machines and dolly vehicles with one or more steered axles have recently been proposed. Such dolly vehicles can provide additional power to the vehicle combination, thus reducing the traction power requirements imposed on the prime mover vehicle. Electrified dolly vehicles may also reduce overall fuel consumption by the vehicle combination, since they provide a degree of hybridization to conventional diesel-engine powered tractors. Steered axle dolly vehicles may furthermore be used for improved steering of the vehicle combination, e.g., when negotiating sharp curves. This type of control for manoeuvring through sharp turns is predominantly executed at low vehicle velocities and comprises steering by the dolly unit in a direction opposite to the direction of the articulation angle, i.e., opposite to the direction of the vehicle unit in front of the dolly.

U.S. Pat. No. 10,518,831 B2 relates to self-powered steerable dolly vehicles. Methods for controlling the dolly vehicles in order to, e.g., negotiate sharp turns, are disclosed.

U.S. Pat. No. 9,598,089 B2 discusses stability of long vehicle combinations comprising a dolly. Methods for steering the dolly vehicle to improve overall vehicle stability are disclosed. However, there is a need for more advanced control methods in order to extract the full potential of self-powered steerable dolly vehicles.

US2002/0180178 A1 discloses a steerable dolly that can be manually and/or automatically switched among multiple modes. The dolly receives its primary input from the angle of the rear of the front trailer for another towing vehicle). There are at least two modes. In one mode the wheels of the dolly are steered in the opposite direction as the rear trailer, providing more maneuverability. In the other mode the wheels are steered in the same direction, providing a more stable mode.

AU2012216710 A1 discloses a method of controlling the sideways motion of a trailer forming part of a combination vehicle, such as a road train, for road transport of heavy goods. The vehicle has a trailer including a semi-trailer body and a dolly mounted beneath the front of the semi-trailer body.

US2001/0054524 A1 discloses a method and apparatus for controlling the steering of a trailing section of a multi-sectioned vehicle.

CN109407517 A teaches a trailer system path tracking method in which a kinematics model for the i+1th trailer in the vehicle combination is determined based on the motion state of the i-th trailer and on the coupling forces between the i-th trailer and the i+1th trailer.

SUMMARY

It is an object of the present disclosure to provide improved methods for controlling self-powered steerable dolly vehicles. This object is obtained at least in part by a method for controlling steering of a self-powered steerable dolly vehicle during a maneuver. The method comprises determining an articulation angle associated with a drawbar of the dolly vehicle and a direction of the articulation angle. The method also comprises determining a longitudinal position of the dolly vehicle along a track and a longitudinal velocity of the dolly vehicle. The method further comprises controlling the steering of the dolly vehicle based on the articulation angle and on the longitudinal position of the dolly vehicle, wherein the controlling comprises steering the dolly vehicle in the articulation angle direction in case the longitudinal velocity of the dolly vehicle is above a velocity threshold.

By steering the dolly vehicle in the direction of the articulation angle, i.e., steering to follow the vehicle unit in front of the dolly vehicle, the effective wheelbase of the vehicle combination is extended which makes the vehicle more resilient to lateral acceleration and helps to reduce generation of lateral forces as a consequence of, e.g., an evasive maneuver at high vehicle velocity. By controlling the steering of the dolly vehicle based also on the longitudinal position of the dolly vehicle lateral forces are further suppressed since the position dependent control allows for accurate timing and coordination of control maneuvers.

The velocity threshold may be configured somewhere between 10-40 km/h, and preferably 20-30 km/h, and more preferably 30 km/h, depending on the type of vehicle and on the driving scenario.

It is appreciated that the control of the steering of the dolly vehicle based on the articulation angle and on the longitudinal position of the dolly vehicle can be performed based on applying a steering angle using a steered axle on the dolly vehicle. However, steering can also be performed using other types of MSDs, such as service brakes and electric machines capable of regenerative braking. Combinations of different MSDs can often be used with advantage depending on the current driving scenario and on the current vehicle state. Thus, the dolly vehicle steering can be performed using a steered axle, or by means of selectively braking or accelerating individual wheels on the dolly, or preferably by a combination of motion support device operations tailored to the given scenario.

According to aspects, the controlling comprises applying a steering angle in the articulation angle direction which is proportional to the articulation angle. This proportional control of the steering angle offers a simple and low complexity yet robust implementation option, which is an advantage.

According to aspects, the maneuver is an evasive maneuver associated with significant lateral acceleration. Evasive maneuvers at high velocity give rise to so-called rearward amplification effects where the lateral forces generated at the different vehicle units increase with distance from the towing vehicle. The presented methods are particularly suitable for safely performing evasive maneuvers at higher velocities.

According to aspects, the controlling comprises initially steering the dolly vehicle in a direction opposite to the articulation angle direction in case the longitudinal velocity is below the velocity threshold. If the velocity is not significant, then the type of counter-steering used with advantage to, e.g., negotiate sharp turns, can be applied without reducing overall vehicle safety.

According to aspects, the method comprises estimating one or more coupling forces associated with the dolly vehicle drawbar and/or a fifth wheel connection arranged on the dolly vehicle. The controlling then comprises generating an accelerating or a decelerating force in dependence of the one or more coupling forces. It is an advantage to be able to base control on the coupling forces, both since it allows for an additional degree of freedom in executing controls to reach a desired motion behaviour, and also since evasive manoeuvres comprising braking or accelerations can be performed with regard to keeping coupling forces at acceptable levels.

According to aspects, the method comprises controlling the dolly vehicle independently from a towing vehicle arranged to tow the dolly vehicle. This means that the dolly vehicle can be used also with legacy towing vehicles that lack advanced control units configured to control the functions of the dolly vehicle, which is an advantage.

According to aspects, the method comprises controlling one or more trailer units connected to the dolly vehicle. In these cases, the dolly vehicle operates in a master mode where it is able to assume control of other vehicle units in the vehicle combination and control these vehicles in order to reach a desired vehicle motion behaviour. For instance, a trailer being towed by the dolly unit may comprise service brakes which can be controlled by the dolly vehicle. The trailer may even comprise propulsion units which can be used to assist turning the vehicle combination during, e.g., an evasive manoeuvre.

According to aspects, the method comprises controlling the dolly vehicle based on one or more control signals received from a master control unit. In these cases, the dolly vehicle operates in a slave mode where it is configured to receive requests and control signals from a master control unit implemented, e.g., in the tractor. The master control unit may also be remotely located and arranged to control the dolly via wireless link. It is an advantage that the dolly comprises a measure of intelligence allowing it to, e.g., control its own MSDs to fulfil a request comprising, e.g., the generation of a given force vector or moment. The dolly vehicle is arranged to coordinate and to control its on-board MSDs in order to reach the desired global force and moment, which simplifies the interface between the master control unit and the dolly vehicle.

According to aspects, the controlling comprises initially steering the dolly vehicle in a direction of the articulation angle direction in case the rate of change of the articulation angle is above an articulation angle change rate threshold and/or in case a magnitude of the articulation angle is above an articulation angle magnitude threshold. Thus, advantageously, smaller controlled turning maneuvers by the tractor will not result in evasive maneuver action from the dolly vehicle.

According to aspects, the method also comprises obtaining dolly vehicle state data from one or more on-board sensors arranged on the dolly vehicle. The one or more sensors comprise a radar sensor, a lidar sensor, or a vision-based sensor. The method then comprises estimating a wheel radius associated with the dolly vehicle based on the vehicle state data and on wheel speed data obtained from a wheel speed sensor. This wheel radius can be used to accurately determine a longitudinal position of the dolly vehicle as it travels along a track, based on how far the wheel has rolled.

According to aspects, the method comprises controlling at least one out of a pivoting ability of a fifth wheel connection, a service brake, an active suspension, and/or a propulsion unit associated with the dolly vehicle. These different MSDs can be used to improve vehicle stability at least temporarily during a maneuver associated with significant lateral acceleration, such as an evasive maneuver.

There is also disclosed herein computer programs, computer readable media, computer program products, control units and vehicles associated with the above discussed advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings:

FIGS. 1A-B schematically illustrate some example heavy duty vehicle combinations;
FIGS. 2A-B schematically illustrate vehicle motion management control functions.

DETAILED DESCRIPTION OF EXAMPLE EMBODIMENTS OF THE INVENTION

Figure 3:
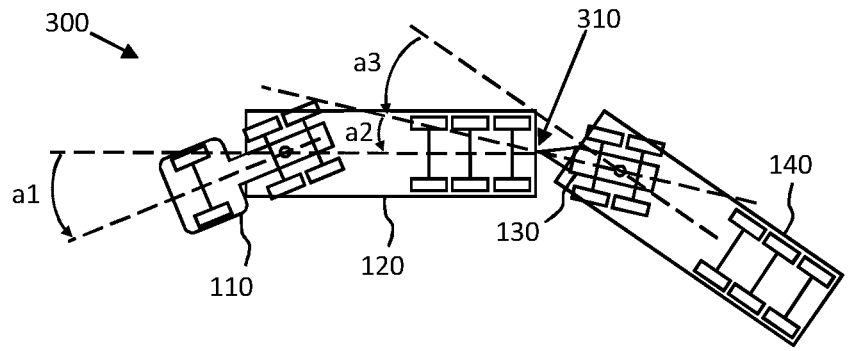
FIGS. 3-5 show vehicle combinations comprising a dolly vehicle.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

FIGS. 1A and 1B illustrate example vehicles 100 for cargo transport where the herein disclosed techniques can be applied with advantage. FIG. 1A shows a truck or towing vehicle 110 supported on wheels 115, at least some of which are driven wheels. The truck 110 is configured to tow a first trailer unit 120 in a known manner. To extend the cargo transport capability of the vehicle combination, a dolly vehicle 130 can be connected to the rear of the first trailer 120. This dolly vehicle can then tow a second trailer 140, as illustrated in FIG. 1B, where the towing vehicle 110 is now of a type which also carries some cargo. A dolly vehicle 130 is traditionally a passive vehicle comprising no driven or steerable axles. It has, however, recently been shown that self-powered steerable dolly vehicles may provide both increased fuel efficiency and maneuverability. Increased fuel efficiency is for instance obtained if an electric machine arranged for regenerative braking is installed in the dolly vehicle. The vehicle combination then effectively becomes a hybrid electric vehicle, even if the towing vehicle only comprises a traditional diesel engine with no electric hybridization.

Both the towing vehicle 110 and the steerable dolly vehicle 130 may comprise control units. These control units can be arranged according to a layered functional architecture where some functions may be comprised in a traffic situation management (TSM) layer and some other functions may be comprised in a vehicle motion management (VMM) layer.

Generally, the TSM layer plans vehicle operation with a time horizon of, e.g., 10 seconds. This time frame for instance corresponds to the time it takes for the vehicle to negotiate a curve, i.e., to transition from driving straight to entering the curve and then exiting the curve again. The TSM layer continuously requests desired acceleration profiles ($a_{req}$) and curvature profiles ($c_{req}$) from the VMM layer. The VMM layer operates with a time horizon of about 1 second or so, and continuously transforms the acceleration profiles and curvature profiles into control commands, sometimes referred to as requests, for the various motion support device (MSD) functions on the vehicle, i.e., it among other things performs MSD coordination.

A vehicle combination like the vehicle combinations illustrated in FIGS. 1A and 1B follow a track. Each vehicle unit in the combination follows its own track, and the tracks can be estimated or predicted based on known vehicle models. Herein, a longitudinal position of a vehicle unit refers to a one-dimensional coordinate along the vehicle unit track.

Active steering of a dolly unit steered axle is an MSD of particular importance to the control concepts discussed herein. Other MSDs of importance include brakes, propulsion units, active suspension, and the like. As noted above, dolly steering can be generated by controlling a steered axle on the dolly, but also by selectively applying positive and negative torques to individual wheels on the dolly. This can be accomplished by, e.g., services brakes and/or electrical machines capable of both propulsion (positive torque) and regenerative braking (negative torque). An active suspension system may sometime also be used to generate a steering behavior. In other words, lateral motion can primarily be controlled using a steered axle on the dolly vehicle. However, other types of MSDs can also be used to generate lateral motion. For instance, the service brakes can be used with advantage to generate steering. Because the wheelbase on a dolly is relatively short compared to, e.g., a tractor or a trailer, this type of yaw motion braking to generate steering is normally efficient.

FIGS. 2A and 2B schematically show example vehicle control stacks 200, 250 in which various vehicle control functions are incorporated. Some modern trucks may comprise one stack, and the dolly vehicle 130 may comprise another stack, as shown in FIG. 2A. The two stacks are connected via an interface 210. A truck comprising a control unit implementing both TSM and VMM functions may then act as master, while the one or more dolly vehicles in a vehicle combination operate in a slave mode. Thus, although the control unit in the dolly vehicle 130 comprises a stand-alone TSM function (TSM B), this function is at least partly inactivated in FIG. 2A since the TSM functions are being executed by the master control unit in the truck 110.

However, the dolly vehicle 130 may also be connected to a legacy towing vehicle which does not comprise an advanced control unit. In this case the dolly vehicle control functions according to at least some of the prior art cannot be used since the functions often rely on control inputs from a master control unit arranged in, e.g., the truck 110.

According to the present disclosure, the VMM slave mode in the dolly may be shifted to VMM master mode in case the dolly unit is connected to a legacy truck 110 which is not able to assume the role of master. The dolly vehicle then calculates its own required forces and moments based, e.g., on requests received from the on-board TSM function (TSM B), as shown in FIG. 2B, independently of the truck 110.

It is appreciated that the one or more trailer units may also comprise VMM modules comprised in control units. If the dolly vehicle 130 in FIG. 2B has a semitrailer connected to it, or is being towed by a semi-trailer, then the VMM function on the trailer unit may receive global force requests and moment requests from the VMM in the dolly even if the prime mover 110 does not comprise a VMM function. The VMM function in the trailer normally operates in slave mode.

A problem associated with long combination vehicles is known as rearward amplification. This problem was discussed in, e.g. U.S. Pat. No. 9,598,089 B2 and relates to the problem of the rearward units in a long vehicle combination experiencing amplified lateral forces during some types of manoeuvres like evasive manoeuvres.

The present disclosure relates at least in part to vehicle combinations where the towing vehicle does not comprise any advanced control units implementing functions such as a TSM layer or a VMM layer control function. This means that the dolly vehicle 130 must operate in a stand-alone manner without aid from the towing vehicle or from some external master control unit. Consequently, many of the known methods involving control functions implemented in the truck cannot be relied upon to provide vehicle stability in long combination vehicles comprising one or more dolly vehicles. It is an object of the present disclosure to provide control methods for stabilizing long combination vehicles during evasive manoeuvres at high velocity which can be executed by a dolly vehicle independently from a truck or towing vehicle.

FIG. 3 shows a vehicle combination 300 as it executes a turning maneuver. The different vehicle units then exhibit articulation angles a1-a3. Each articulation angle is associated with an articulation angle direction as indicated by the arrows. The articulation angle direction is the direction in which the forward vehicle unit is rotated with respect to a rearward vehicle. I.e., if the vehicle unit directly in front of a dolly vehicle turns to the left, then the articulation angle direction is to the left when seen from the dolly vehicle. These articulation angles can be determined using, e.g., articulation angle sensors or global positioning receivers arranged on the different vehicle units. The articulation angle can also be determined by vision-based sensors or radar transceivers arranged to detect an angle between two consecutive vehicle units in a combination vehicle. Thus, articulation angle associated with both drawbar and fifth wheel connection can be determined by a dolly vehicle without assistance from other vehicle units.

In order to provide a steerable dolly vehicle, e.g., with a steerable axle or with individually controllable electric machines on at least a subset of the dolly wheels, that is able to operate independently of a master control unit arranged in, e.g., a truck 110, and still improve vehicle stability during evasive manoeuvres, it is proposed herein to control the steering based on the articulation angle of the dolly vehicle drawbar, i.e., angle a2 in FIG. 3, and also on the longitudinal velocity of the dolly vehicle 130. The longitudinal velocity of the dolly vehicle can be determined based on, e.g., wheel speed sensors on the dolly vehicle 130, or based on input signals from a global positioning system (GPS) receiver arranged in connection to the dolly vehicle 130. Thus, these quantities can be determined by the dolly vehicle 130 independently of the capabilities of the other vehicles in the combination. The dolly vehicle steering is controlled based on the articulation angle at the dolly drawbar such that the dolly is steered in the direction of the vehicle connected to the drawbar of the dolly vehicle, i.e., in the direction of the drawbar articulation angle a2 as discussed above in connection to FIG. 3. This means that the dolly tries to follow the vehicle unit immediately in front of the dolly, i.e., the vehicle unit to which the dolly drawbar is connected, at least when the velocity is above a velocity threshold. The steering angle may, e.g., be controlled to be proportional to the articulation angle. This way vehicle stability can be improved during, e.g., evasive manoeuvring at high or medium vehicle velocity without relying on an advanced master control unit arranged in the truck 110.

The type of counter-steering by the dolly vehicle 130 proposed in, e.g., U.S. Pat. No. 10,518,831 B2 for negotiating sharp turns is automatically inactivated at higher vehicle velocities, i.e., when the dolly vehicle longitudinal velocity is above the configured velocity threshold. This is advantageous, since counter-steering has a negative effect on vehicle stability and rearward amplification during evasive manoeuvring at higher vehicle velocities. Again, the inactivation of the counter-steering function can be implemented independently of the capabilities of other vehicles in the combination.

Optionally, the steering of the dolly vehicle can be conditioned on the rate of change of the articulation angle being above an articulation angle change rate threshold. This would prevent unnecessary steering of the dolly vehicle in cases where only a slow turning by the towing vehicle is performed. The dolly vehicle steering can optionally also be conditioned on a certain magnitude of the articulation angle, such that no dolly steering is engaged until the magnitude of the articulation angle goes above some pre-configured threshold. An estimator configured to detect onset of an evasive maneuver will be discussed below in connection to FIG. 12.

Figure 7:
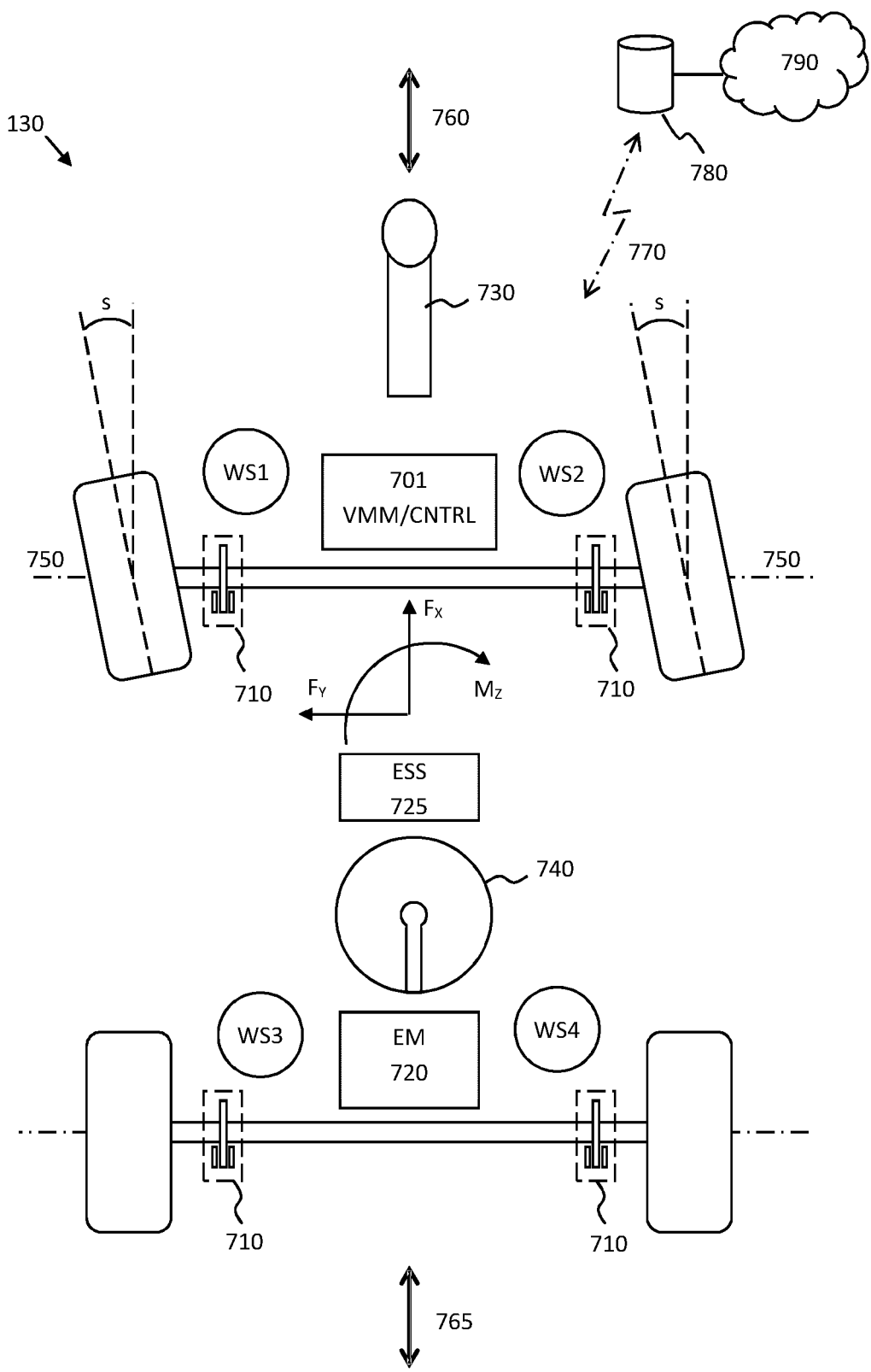
FIG. 7 schematically illustrates details of a dolly vehicle.
Figure 8:
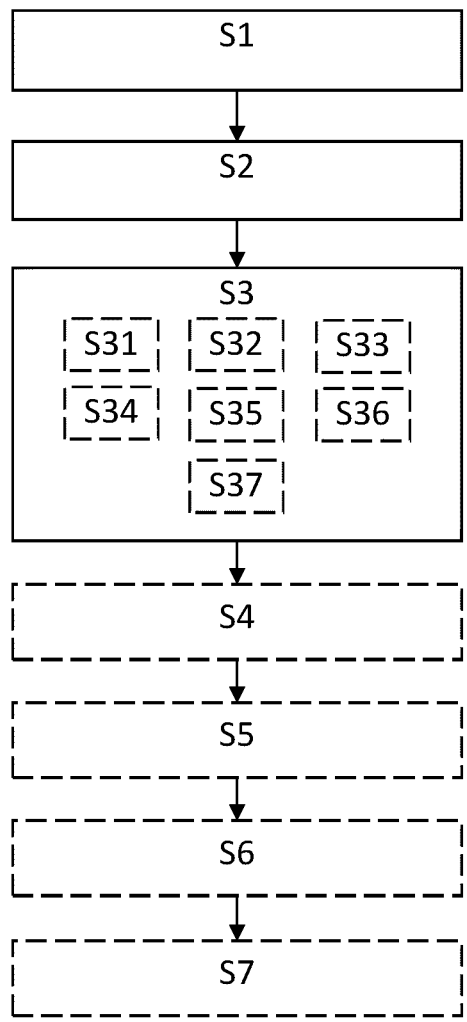
FIG. 8 is a flow chart illustrating methods.

To summarize, with reference also to FIG. 7 and FIG. 8, there is disclosed herein a method for controlling steering of a self-powered steerable dolly vehicle 130 during a maneuver. The method comprises determining an articulation angle a2 associated with a drawbar 730 of the dolly vehicle 130 and a direction of the articulation angle. The method also comprises determining a longitudinal position of the dolly vehicle 130 along a track and a longitudinal velocity of the dolly vehicle 130, and controlling the steering of the dolly vehicle 130 based on the articulation angle a2 and on the longitudinal position of the dolly vehicle 130, wherein the controlling comprises steering the dolly vehicle 130 in the articulation angle direction in case the longitudinal velocity of the dolly vehicle 130 is above a velocity threshold.

Generally, dolly steering can be performed without assistance from a master control unit arranged in the truck or prime mover 110, i.e., optionally, the methods disclosed herein comprises controlling S34 the dolly vehicle independently from a towing vehicle 110 arranged to tow the dolly vehicle. The method can also be performed without determining forces or moments acting on the dolly vehicle 130.

Figure 12:
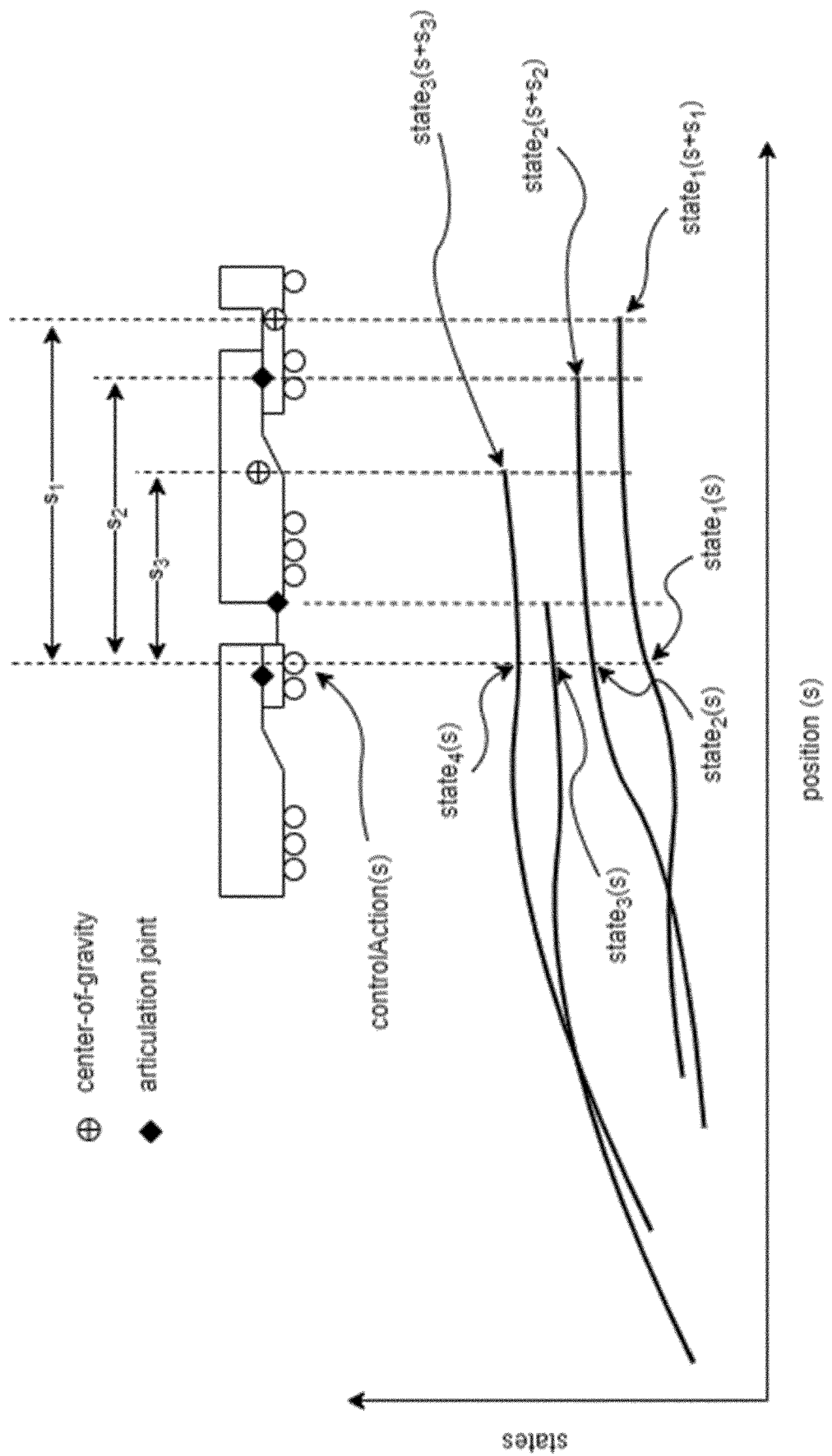
FIG. 12 is a graph showing vehicle unit states as function of position.

FIGS. 12 and 13 illustrate some examples of the herein proposed methods for evasive manoeuvring. FIG. 12 shows an example where an evasive manoeuvre estimator 1110 has been implemented with the purpose to detect when an evasive manoeuvre is being performed. This estimator 1110 may, e.g., be based on the vehicle longitudinal velocity and on the steering rate of change, or on the pitch, yaw and roll motion of the different units in the vehicle combination. When the vehicle evasive manoeuvre estimator detects start of an evasive manoeuvre 1120, recording of vehicle states 1130 is immediately triggered. This function records and stores vehicle state data as exemplified in FIG. 12. This data is stamped with position information 1140, 1150 instead of time, as in the conventional cases. The position data indicates a longitudinal position along a track followed by the vehicle unit in the vehicle combination. The control system, in its parameter sets 1160, already knows the vehicle dimension data that says how far the leading unit is with respect to the position of the dolly. The active system component of the dolly needs to travel to the position of the leading units' component that generates that state, e.g. articulation angle, etc. After reaching the position, the active dolly takes the controlling actions based on the vehicle states associated to that position along the track. The proposed control system calculates control actions 1170 to be executed by the dolly the calculated actions are requested 1180 from the MSD actuators on the dolly vehicle 130. The analogy of the states measured in position domain(s) is exemplified in FIG. 12. The control action at position s is calculation in terms of the vehicle states at s. Note that the different vehicle states at s are measured/estimated at previous different times depending on the length in the longitudinal direction of the vehicle. Thus, it is appreciated that the control actions are performed in dependence of a longitudinal position of the dolly vehicle, or, in other words, controlling the steering of the dolly vehicle 130 is based at least partly on the longitudinal position of the dolly vehicle 130. Every control action is delayed "in distance" in order to improve vehicle stability during evasive manoeuvre at high speeds 1190.

The input to the evasive manoeuvre control methods proposed herein could also be other states received from the up-front vehicle units, i.e., the vehicle units connected ahead of the dolly vehicle 130.

Figure 6A:
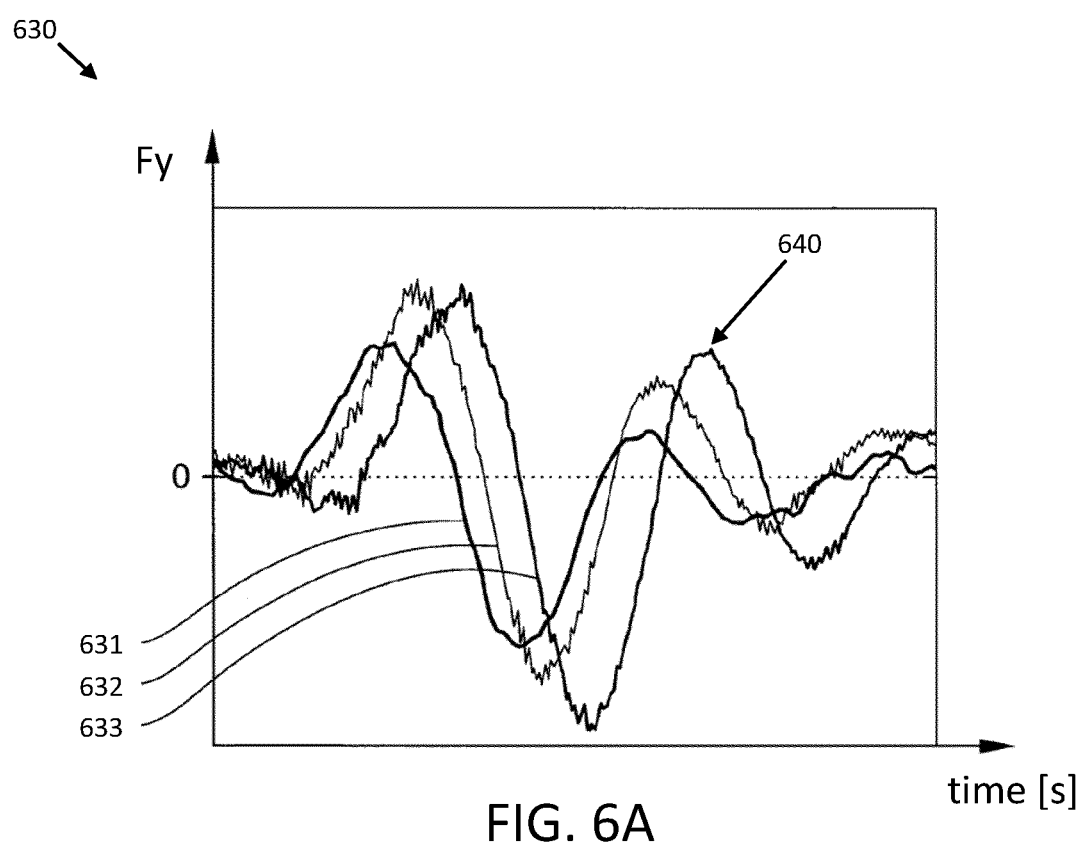
FIG. 6A is a graph showing lateral forces as function of time.

FIG. 6A shows an example 630, taken from U.S. Pat. No. 9,598,089 B2, of the lateral forces Fy generated for different vehicle units during an evasive maneuver in case no steering is applied at the dolly vehicle 130. The first curve 631 is the lateral forces generated at the center of gravity of the tractor 110, the second curve 632 represents the lateral forces generated at the center of gravity of the first trailer unit 120, and the third curve 633 shows the lateral forces generated at the center of gravity of the third trailer unit 140. The rearward amplification effect 640 is clearly seen as an amplitude increase for the second trailer unit compared to the tractor. The herein disclosed techniques provides a reduction of the rearward amplification effect 640 by actively steering the dolly vehicle 130 independently from an external control unit arranged in, e.g., the tractor 110. Thus, advantageously, rearward amplification can be reduced by the techniques proposed herein also in vehicle combinations powered by legacy towing vehicles which are not equipped with advanced control units implementing functions such as TSM and VMM.

It is appreciated that rearward amplification effects can also be observed for lateral accelerations and yaw rates of vehicle units connected further to the rear in long vehicle combinations.

Figure 6B:
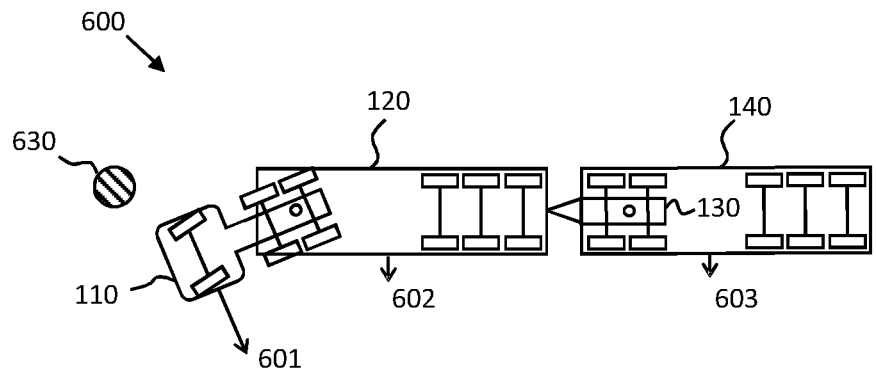
FIGS. 6B-D schematically illustrate a vehicle maneuver.
Figure 6C:
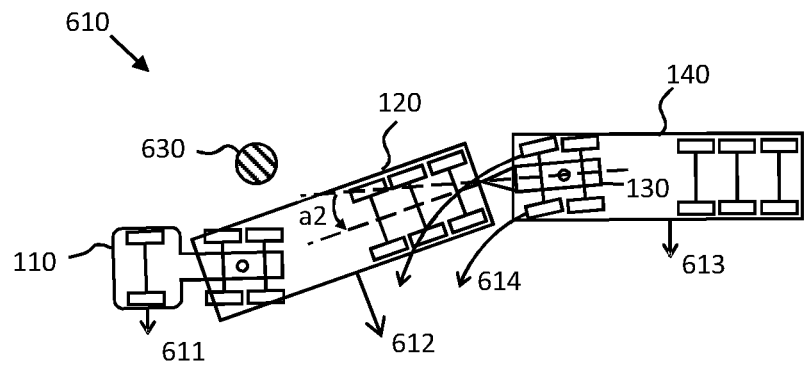
Figure 6D:
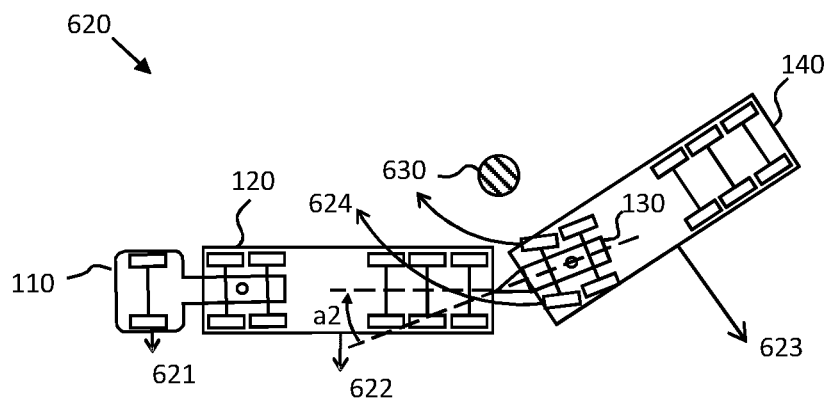

FIGS. 6B-6D illustrate an example evasive manoeuvre according to the teachings herein. The manoeuvre starts in FIG. 6B by the tractor 110 turning to avoid some obstacle 630. This generates lateral forces 601, 602, 603. The lateral forces generated at the tractor are initially larger than the lateral forces 602, 603 generated for the first and second trailer units. In FIG. 6C, some time has passed and the articulation angle a2 has increased. This is detected by the dolly vehicle which starts to turn 614 in direction of the articulation angle direction, i.e., in the direction of the vehicle unit 120 directly in front of the dolly unit to which vehicle unit the dolly drawbar is connected. Eventually the articulation angle a2 changes direction, which is illustrated in FIG. 6D. This is detected by the dolly vehicle 130 which controls the steering to be in the direction 624 of the articulation angle direction. Notably, the steering operations performed by the dolly vehicle are based on data determined by the dolly vehicle without outside assistance from other vehicle in the combination.

By steering in direction of the articulation angle direction the effective wheelbase of the combination vehicle is extended, which provides a more stable vehicle combination better able to perform maneuvers associated with high lateral forces, such as an evasive maneuver in high velocity. The applied steering angle may, e.g., be controlled to be approximately proportional to the articulation angle. This means that the larger the articulation angle a2, the larger the applied steering angle becomes. The velocity threshold may be configured somewhere between 10-40 km/h, and preferably 20-30 km/h, and more preferably 30 km/h. Optionally, the steering of the dolly vehicle can as mentioned above be conditioned on the rate of change of the articulation angle being above an articulation angle change rate threshold. The dolly vehicle steering can also be conditioned on a certain absolute value of the articulation angle. This means that no active dolly steering is performed until the magnitude of the articulation angle a2 goes above a pre-configured threshold. This threshold may be set to a value between, e.g., 5-15 degrees, for instance 10 degrees. This would prevent small continuous adjustments of the dolly steering in situations where dolly steering is not necessary for vehicle stability.

The dolly vehicle steering can furthermore be conditioned on a certain absolute value of moment Mz (see FIG. 5) experienced by the dolly vehicle 130. This moment or, equivalently, rotational acceleration, can be determined by an inertial measurement unit (IMU) arranged on the dolly vehicle. Active dolly steering can optionally only be triggered if the moment is above some pre-configured threshold.

If the vehicle velocity is relatively small, i.e., below the velocity threshold, then the counter steering operations described in, e.g., U.S. Pat. No. 10,518,831 B2, may be applied without risk of negatively affecting vehicle stability. In other words, the controlling optionally comprises initially steering S32 the dolly vehicle 130 in a direction opposite to the articulation angle direction in case the longitudinal velocity is below the velocity threshold. This steering operation can again be performed in an independent manner without receiving control signals from an external control unit such as from a master control unit arranged in the truck 110. Notably, this counter-steering at low vehicle velocity can be seen as proportional control of the steering where the gain factor is selected to be negative initially at low velocities.

Figure 4:
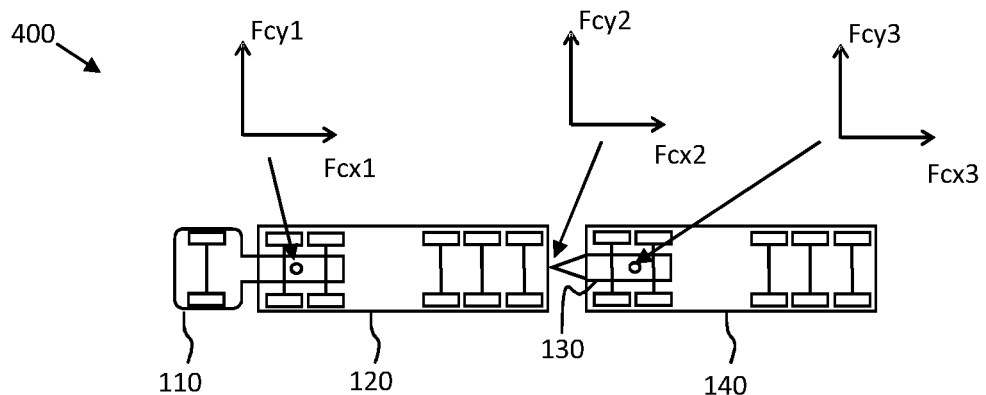

One way to infer information about the state of the overall vehicle combination despite having no advanced sensor functions or control units arranged in the truck 110 is to monitor coupling forces. FIG. 4 illustrates lateral Fcx and longitudinal Fcy coupling forces of a vehicle combination 400 for different coupling points. Each coupling point has an associated coupling force vector. The coupling forces may be given in two or three dimensions, depending on implementation. The coupling forces offer another dimension of vehicle control which can be exploited by a VMM, such as a master VMM function in a prime mover or in a dolly vehicle, in order to generate a set of required global forces. For instance, coupling force may be used to brake a vehicle unit which experiences poor friction by a rearward vehicle unit which experiences better friction conditions, i.e., using the rearward vehicle unit as an anchor to slow down the whole vehicle combination. According to aspects, the dolly vehicle 130 is arranged to control the at least one MSD to generate a requested coupling force associated with the drawbar or with a fifth wheel connection of the dolly vehicle. Small or even non-existent coupling forces are normally desired when braking a vehicle combination, which means that each vehicle unit in a vehicle combination applies its service brakes to a degree which brakes the vehicle unit without generating significant coupling forces with respect to other vehicle units in the combination.

These coupling forces may be used to define an operational regime of a self-powered dolly vehicle acting as master controller in a vehicle combination comprising a legacy truck 110 which lacks advanced control units implementing a TSM and/or a VMM function. For instance, if a pushing coupling force is detected at the drawbar of the dolly vehicle, then the dolly unit may apply some braking force without affecting vehicle stability. Likewise, if a pulling coupling force is detected at a coupling point of the dolly vehicle, then this indicates that some accelerative force may be applied at the dolly unit without negatively affecting vehicle stability.

With reference again to FIG. 7 and FIG. 8, according to aspects, the techniques proposed herein comprises estimating S4 one or more coupling forces Fcx, Fcy associated with the dolly vehicle drawbar 730 and/or a fifth wheel connection 740 arranged on the dolly vehicle 130, wherein the controlling S33 comprises generating an accelerating or a decelerating force in dependence of the one or more coupling forces. This way coupling forces can also be kept within acceptable limits during an evasive manoeuvre.

A vehicle combination comprising more than one dolly vehicle with a control unit capable of executing TSM and/or VMM functions may configure one of the dolly vehicles as master and the other dolly vehicles as slave units. This may for instance be the case in the vehicle combination shown in FIG. 1B. The master dolly unit then determines required global forces and transmits requests to the MSDs of the other dolly vehicles. A dolly vehicle VMM function operating in slave mode receives force generation data from a master control unit and therefore disables its own force generation function in order not to interfere with the master control. The force generation data is preferably translated into a local coordinate system of the slave dolly vehicle, as will be discussed in more detail below in connection to FIG. 5. According to some aspects, the methods disclosed herein comprises controlling S36 the dolly vehicle 130 based on one or more control signals received from a master control unit.

The master VMM function performs actuator coordination and sends requests to the MSDs in the slave dolly and in any trailers towed by the dolly vehicle, and in particular to the dolly steering. The dolly VMM acting in slave mode then forwards the MSD requests from the master VMM to its MSDs, such as steering, powertrain, and brakes. The VMM acting in slave mode performs motion estimation for the dolly vehicle 130 and reports back the result of this estimation to the master VMM. The dolly VMM operating in slave mode also controls on-board functions such as powertrain configuration, parking brakes, active suspension and trailer coupling. The VMM function in slave mode may furthermore perform slip control.

A dolly operating in master mode naturally controls its own MSDs, such as steering, brakes, propulsion, and suspension. It may also control the fifth wheel connection to dampen or even prevent pivoting motion by the fifth wheel, which may provide a more rigid vehicle combination. A dolly unit operating in master mode may also assume control of any advanced trailer units comprised in a combination vehicle, in case these trailer units comprise control units implementing VMM functions, or comprise MSDs which are controllable from a VMM function in the vehicle combination. This is again an advantage in scenarios where the towing truck is an older truck that lacks advanced control units implementing a VMM function. Thus, according to aspects, the methods disclosed herein comprises controlling one or more trailer units connected to the dolly vehicle.

The dolly vehicles discussed herein are capable of acting both as slave units when they are connected to, e.g., a towing vehicle comprising a control unit implementing a TSM and/or VMM function, as well as master units in case they are connected to a legacy towing vehicle which does not comprise advanced control units. This is an advantage, since the dolly units are able to stabilize a vehicle combination during, e.g., evasive manoeuvres, even if the truck is an older truck lacking advanced control units.

Figure 5:
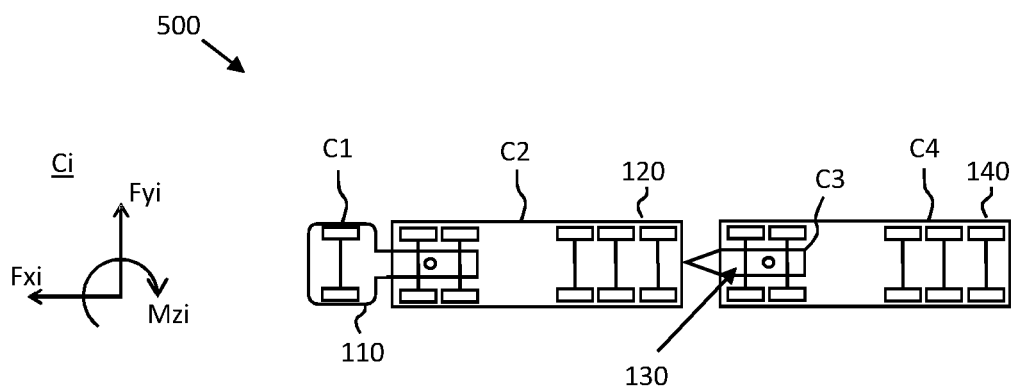

FIG. 5 shows a vehicle combination 500 comprising a dolly vehicle 130 connecting a first trailer 120 to a second trailer 140. A vehicle combination such as the combination 500 comprises a plurality of local coordinate systems C1, C2, C3, and C4. Lateral forces Fy, longitudinal forces Fx, and moments of inertia Mz about some point on a vehicle unit can be expressed in a global coordinate system or in a local coordinate system associated with a particular vehicle unit. It is convenient for each VMM of the vehicle combination to receive global force requests from the master VMM (which may be implemented either in the truck 110 or in the dolly 130) in its own local coordinate system. According to some aspects of the present disclosure, the master VMM determines global force requests in each of the coordinate systems (C1-C4) of the vehicle combination and sends global force and moment requests to each VMM in its own coordinate system. Alternatively, the transmitted force requests are given in a global coordinate system and a transform for transforming into the desired coordinate system is provided by the master VMM function. This greatly simplifies VMM design for the slave units in the combination vehicle and also the interface between the different VMMs in a vehicle combination.

To transform a vehicle state such as a velocity or acceleration vector, a rotation and potentially also a translation is required. The translation is normally just a biasing based on a relative location of the two coordinate systems in space. A rotation from one coordinate system into another coordinate system can, e.g., be perform by multiplication with a rotation matrix. Suppose that the rotation around an X-axis of one vehicle unit with respect to another vehicle unit is $\phi$, the rotation around a Y-axis is $\theta$, and the rotation around a Z-axis is $\varphi$, then the corresponding rotation matrix is $$R = R_X R_Y R_Z \text{ where}$$

$$R_X = \begin{bmatrix} 1 & 0 & 0 \\ 0 & \cos(\phi) & \sin(\phi) \\ 0 & -\sin(\phi) & \cos(\phi) \end{bmatrix}$$

$$R_Y = \begin{bmatrix} \cos(\theta) & 0 & \sin(\theta) \\ 0 & 1 & 0 \\ -\sin(\theta) & 0 & \cos(\theta) \end{bmatrix}$$

$$R_Z = \begin{bmatrix} \cos(\varphi) & \sin(\varphi) & 0 \\ -\sin(\varphi) & \cos(\varphi) & 0 \\ 0 & 0 & 1 \end{bmatrix}$$

Any vector can be rotated by multiplication with the matrix R. The VMM is able to determine this matrix based on the state of the vehicle combination, i.e., based on vehicle unit geometries and articulation angles.

FIG. 7 shows aspects of the disclosed dolly vehicle 130. The dolly vehicle comprises a steerable axle 750. This particular dolly vehicle also comprises a set of service brakes 710, here shown as disc brakes, although drum brakes or retarders are equally possible. The dolly vehicle also comprises an electric machine 720 and associated electrical energy storage (ESS) 725, which means that the dolly is self-powered and able to move both itself and one or more towed trailers without the assistance of a truck or prime mover vehicle. Thus, according to aspects, the at least one MSD of the dolly units disclosed herein comprises a propulsion unit 720 configured in connection to a driven axle of the dolly vehicle. According to aspects, the methods disclosed herein comprises controlling at least one out of a pivoting ability of a fifth wheel connection 740, a service brake 710, an active suspension, and/or a propulsion unit 720 associated with the dolly vehicle 130.

The dolly vehicle may be connected to truck or forward vehicle unit via a drawbar connection 730. A trailer may be connected to the dolly via a fifth wheel connection 740. The dolly vehicle 130 comprises one or more sensors arranged to determine an articulation angle of the drawbar connection 730.

A control unit 701 is arranged on the dolly vehicle and configured to control the various MSDs on the dolly vehicle, i.e., the brakes, the electric machine, the suspension, and in particular the steering. The control unit implements the type of VMM functions discussed above and can be configured in a master mode or in a slave mode depending on operating scenario. This control unit 701 may be communicatively coupled to a forward part of a vehicle combination via a forward interface 760, and to a rearward part of a vehicle combination via a rearward interface 765.

Notably, the control unit 701 may also be connected to a remote control unit or server 780 via a wireless link 770. This remote control unit may be connected to a communications network 790, such as a communications network defined by the third generation partnership program, 3GPP. Examples of such networks include 4G, 5G and 6G communication networks, as well as networks in the 802.11 family, in particular 802.11p.

The remote control unit 780 may, e.g., be comprised in a control tower arranged to control dollies in a cargo terminal. In this case, the dolly is configured to enter into a slave mode configuration and receive requests from the control tower in a way similar to when it is connected to a master towing vehicle.

The dolly vehicle may furthermore comprise wheel speed sensors WS1-WS4 configured to measure wheel speeds. This enables the control unit 701 to perform fine grained slip control on the wheels using the service brakes and the electric machine. For instance, the control unit 701 on the dolly unit may receive vehicle state data, comprising vehicle velocity, in its own coordinate system via one of the interfaces 760, 765 and 770, and based on this velocity determine wheel slip, in accordance with SAE J670 (SAE Vehicle Dynamics Standards Committee Jan. 24, 2008), as $$\lambda = \frac{R\omega - v_x}{\max(|R\omega|, |v_x|)}$$

where R is an effective wheel radius in meters, ω is the angular velocity of the wheel obtained from the wheel speed sensor, and $v_x$ is the longitudinal speed of the wheel (in the coordinate system of the wheel).

With reference to FIG. 7, the methods disclosed herein comprises obtaining dolly vehicle state data from one or more on-board sensors arranged on the dolly vehicle 130, wherein the one or more sensors comprise a radar sensor, a lidar sensor, or a vision-based sensor, and wherein the method comprises estimating a wheel radius associated with the dolly vehicle 130 based on the vehicle state data and on wheel speed data obtained from a wheel speed sensor WS1-WS4.

FIG. 8 is a flow chart illustrating methods which summarize the discussions above and the capabilities of the herein disclosed control units. FIG. 1 illustrates a method for controlling steering of a self-powered steerable dolly vehicle 130 during a maneuver. The method comprises determining S1 an articulation angle a2 associated with a drawbar 730 of the dolly vehicle 130 and a direction of the articulation angle, determining S2 a longitudinal position of the dolly vehicle 130 along a track and a longitudinal velocity of the dolly vehicle 130, and controlling S3 the steering of the dolly vehicle 130 based on the articulation angle a2 and on the longitudinal position of the dolly vehicle 130. The controlling comprises steering the dolly vehicle 130 in the articulation angle direction in case the longitudinal velocity of the dolly vehicle 130 is above a velocity threshold, as discussed above.

According to aspects, the controlling S31 comprises applying a steering angle s which is proportional to the articulation angle a2.

According to aspects, the maneuver is an evasive maneuver associated with significant lateral acceleration.

According to aspects, the controlling comprises initially steering S32 the dolly vehicle 130 in a direction opposite to the articulation angle direction a2 in case the longitudinal velocity is below the velocity threshold.

According to aspects, the method comprises estimating S4 one or more coupling forces Fcx, Fcy associated with the dolly vehicle drawbar 730 and/or a fifth wheel connection 740 arranged on the dolly vehicle 130, wherein the controlling S33 comprises generating an accelerating or a decelerating force in dependence of the one or more coupling forces.

According to aspects, the method comprises controlling S34 the dolly vehicle independently from a towing vehicle 110 arranged to tow the dolly vehicle.

According to aspects, the method comprises controlling S35 one or more trailer units connected to the dolly vehicle According to aspects, the method comprises controlling S36 the dolly vehicle 130 based on one or more control signals received from a towing vehicle 110 arranged to at least indirectly tow the dolly vehicle 130.

According to aspects, the method comprises obtaining S5 dolly vehicle state data from one or more on-board sensors arranged on the dolly vehicle 130, wherein the one or more sensors comprise a radar sensor, a lidar sensor, or a vision-based sensor, and wherein the method comprises estimating S6 a wheel radius associated with the dolly vehicle 130 based on the vehicle state data and on wheel speed data obtained from a wheel speed sensor WS1-WS4.

According to aspects, the method comprises controlling S7 at least one out of a pivoting ability of a fifth wheel connection 740, a service brake 710, an active suspension, and/or a propulsion unit 720 associated with the dolly vehicle 130.

According to aspects, the velocity threshold is between 10-40 km/h, and preferably 20-30 km/h, and more preferably 30 km/h.

Figure 9:
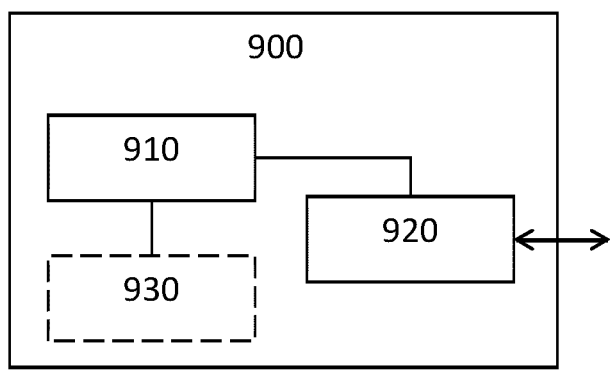
FIG. 9 schematically illustrates a control unit.

FIG. 9 schematically illustrates, in terms of a number of functional units, the components of a control unit 900 according to embodiments of the discussions herein. This control unit 900 may be comprised in the vehicle 100, e.g., in the form of a VMM unit. Processing circuitry 910 is provided using any combination of one or more of a suitable central processing unit CPU, multiprocessor, microcontroller, digital signal processor DSP, etc., capable of executing software instructions stored in a computer program product, e.g. in the form of a storage medium 930. The processing circuitry 910 may further be provided as at least one application specific integrated circuit ASIC, or field programmable gate array FPGA.

Particularly, the processing circuitry 910 is configured to cause the control unit 900 to perform a set of operations, or steps, such as the methods discussed in connection to FIG. 10. For example, the storage medium 930 may store the set of operations, and the processing circuitry 910 may be configured to retrieve the set of operations from the storage medium 930 to cause the control unit 900 to perform the set of operations. The set of operations may be provided as a set of executable instructions. Thus, the processing circuitry 910 is thereby arranged to execute methods as herein disclosed.

The storage medium 930 may also comprise persistent storage, which, for example, can be any single one or combination of magnetic memory, optical memory, solid state memory or even remotely mounted memory.

The control unit 900 may further comprise an interface 920 for communications with at least one external device. As such the interface 920 may comprise one or more transmitters and receivers, comprising analogue and digital components and a suitable number of ports for wireline or wireless communication.

The processing circuitry 910 controls the general operation of the control unit 900, e.g., by sending data and control signals to the interface 920 and the storage medium 930, by receiving data and reports from the interface 920, and by retrieving data and instructions from the storage medium 930. Other components, as well as the related functionality, of the control node are omitted in order not to obscure the concepts presented herein.

Figure 10:
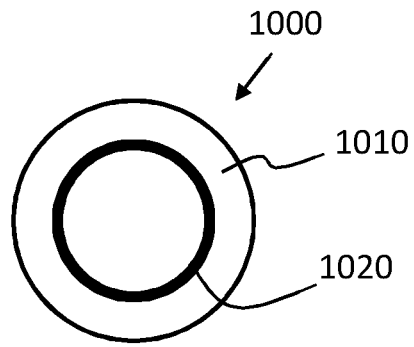
FIG. 10 shows an example computer program product.
Figure 11:
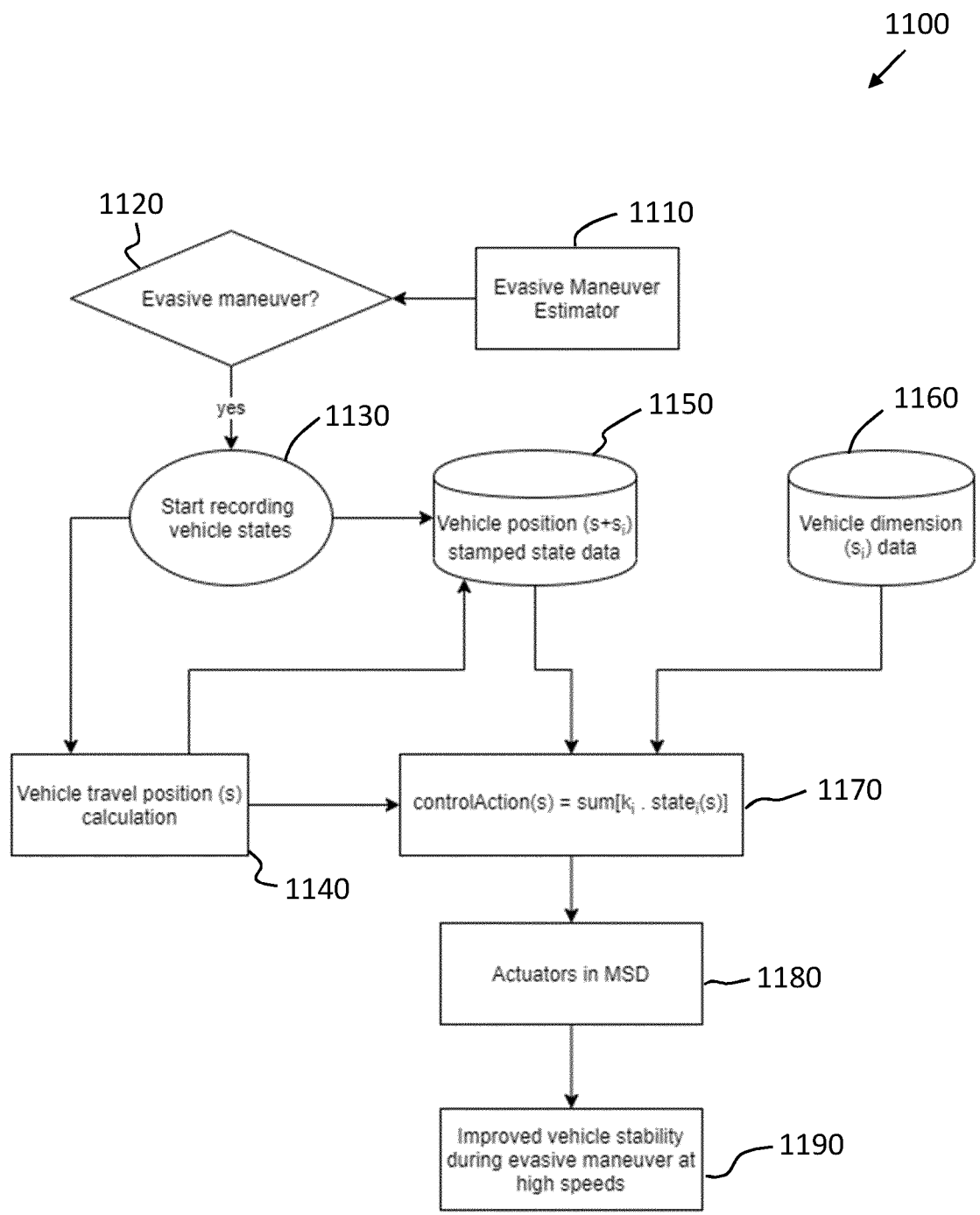
FIG. 11 is a flow chart illustrating methods.

FIG. 10 illustrates a computer readable medium 1010 carrying a computer program comprising program code means 1020 for performing the methods illustrated in FIG. 8, when said program product is run on a computer. The computer readable medium and the code means may together form a computer program product 1000.

The invention claimed is:

1. A method for controlling steering of a self-powered steerable dolly vehicle during an evasive maneuver associated with significant lateral acceleration, the method comprising:
   determining an articulation angle associated with a drawbar of the dolly vehicle and a direction of the articulation angle,
   determining a longitudinal position of the dolly vehicle along a track and a longitudinal velocity of the dolly vehicle, wherein the longitudinal position comprises a one-dimensional coordinate along the track, and
   controlling the steering of the dolly vehicle based on the articulation angle and on the longitudinal position of the dolly vehicle, wherein the controlling comprises steering the dolly vehicle in the articulation angle direction when the longitudinal velocity of the dolly vehicle is above a velocity threshold,
   wherein the controlling comprises initially steering the dolly vehicle in a direction opposite to the articulation angle direction when the longitudinal velocity is below the velocity threshold.

2. The method of claim 1, wherein the controlling comprises applying a steering angle in the articulation angle direction which is proportional to the articulation angle.

3. The method of claim 1, comprising estimating one or more coupling forces associated with the dolly vehicle drawbar and/or a fifth wheel connection arranged on the dolly vehicle, wherein the controlling comprises generating an accelerating or a decelerating force in dependence of the one or more coupling forces.

4. The method of claim 1, comprising controlling the dolly vehicle independently from a towing vehicle arranged to tow the dolly vehicle.

5. The method of claim 1, comprising controlling one or more trailer units connected to the dolly vehicle.

6. The method of claim 1, comprising controlling the dolly vehicle based on one or more control signals received from a master control unit.

7. The method of claim 1, wherein the controlling comprises initially steering the dolly vehicle in a direction of the articulation angle direction when the rate of change of the articulation angle is above an articulation angle change rate threshold and/or when a magnitude of the articulation angle is above an articulation angle magnitude threshold.

8. The method of claim 1, comprising obtaining dolly vehicle state data from one or more on-board sensors arranged on the dolly vehicle, wherein the one or more sensors comprise a radar sensor, a lidar sensor, or a vision-based sensor, and wherein the method comprises estimating a wheel radius associated with the dolly vehicle based on the vehicle state data and on wheel speed data obtained from a wheel speed sensor.

9. The method of claim 1, comprising controlling at least one out of a pivoting ability of a fifth wheel connection, a service brake, an active suspension, and/or a propulsion unit associated with the dolly vehicle.

10. The method of claim 1, wherein the velocity threshold is between 10-40 km/h.

11. A non-transitory computer program product comprising program code for performing, when executed by a computer, the steps of claim 1.

12. A control unit arranged to control steering of a self-powered steerable dolly vehicle during an evasive maneuver associated with significant lateral acceleration, the control unit comprising processing circuitry arranged to:
   determine an articulation angle associated with a drawbar of the dolly vehicle,
   determine a longitudinal position of the dolly vehicle along a track and a longitudinal velocity of the dolly vehicle, wherein the longitudinal position comprises a one-dimensional coordinate along the track,
   to control the steering of the dolly vehicle based on the articulation angle and on the longitudinal position of the dolly vehicle, wherein the controlling comprises initially steering the dolly vehicle in a direction of the articulation angle direction when the longitudinal velocity of the dolly vehicle is above a velocity threshold, and
   to initially steer the dolly vehicle in a direction opposite to the articulation angle direction when the longitudinal velocity is below the velocity threshold.

13. A dolly vehicle comprising the control unit of claim 12.

* * * * *